Figure 6:
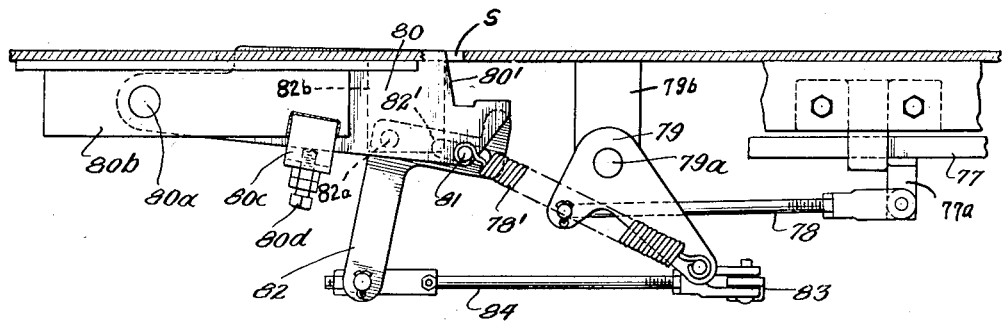

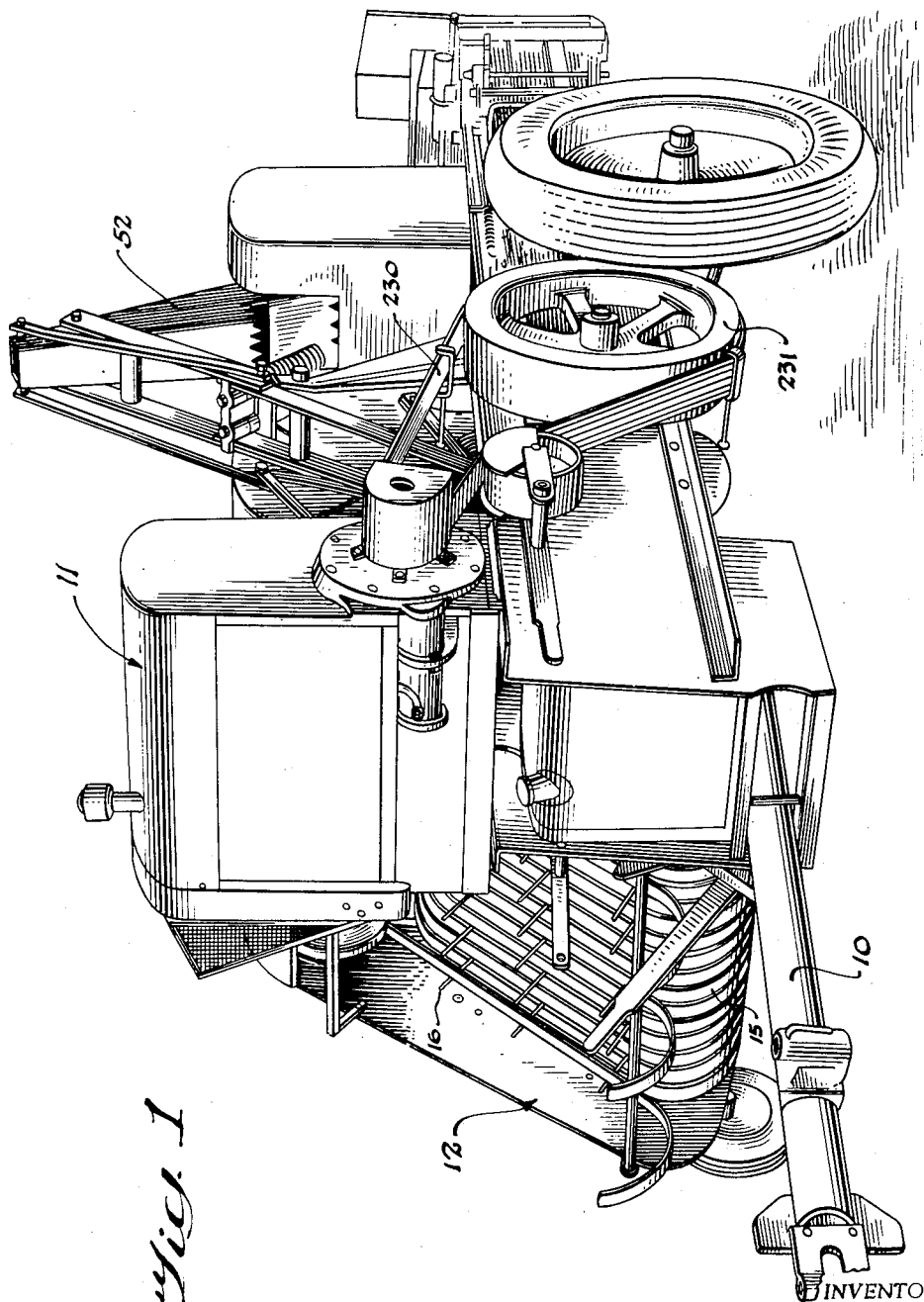

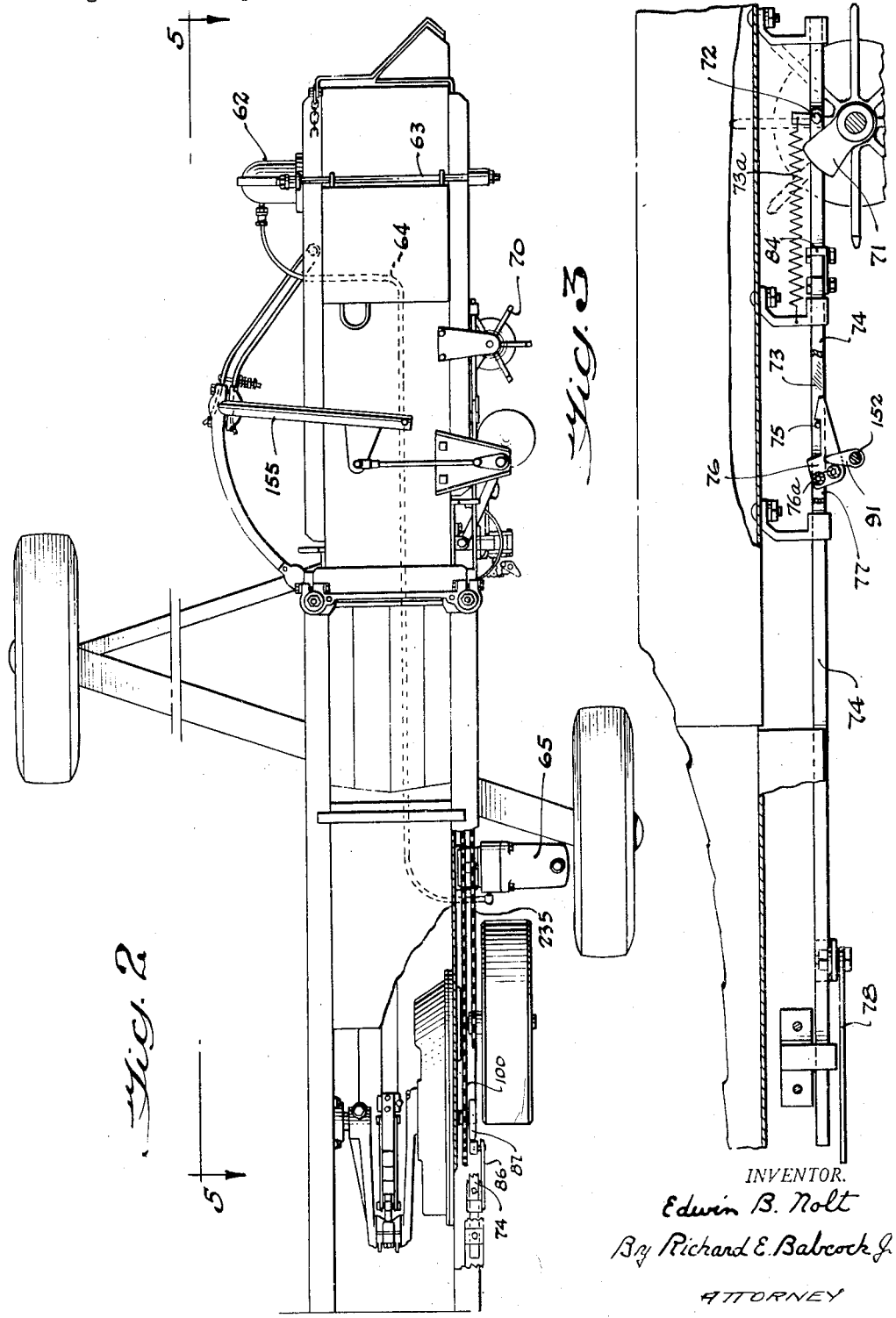

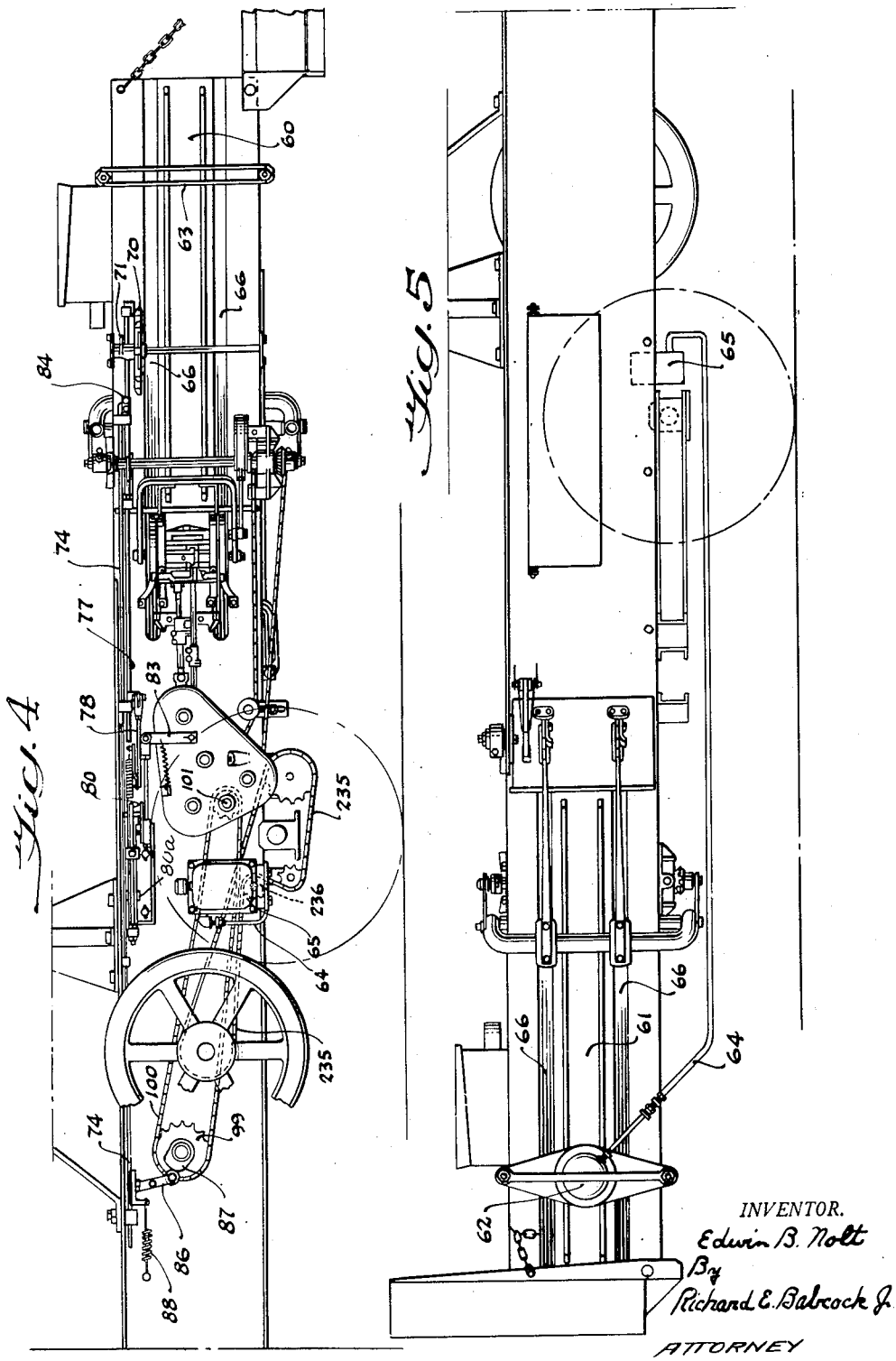

Dec. 4, 1956 E. B. NOLT 2,772,628
BALE METERING AND TRIPPING MECHANISM
Original Filed Sept. 6, 1950 8 Sheets-Sheet 4

INVENTOR
Edwin B. Nolt
BY
Richard E. Babcock Jr.
ATTORNEY

Dec. 4, 1956 E. B. NOLT 2,772,628
BALE METERING AND TRIPPING MECHANISM
Original Filed Sept. 6, 1950 8 Sheets-Sheet 5
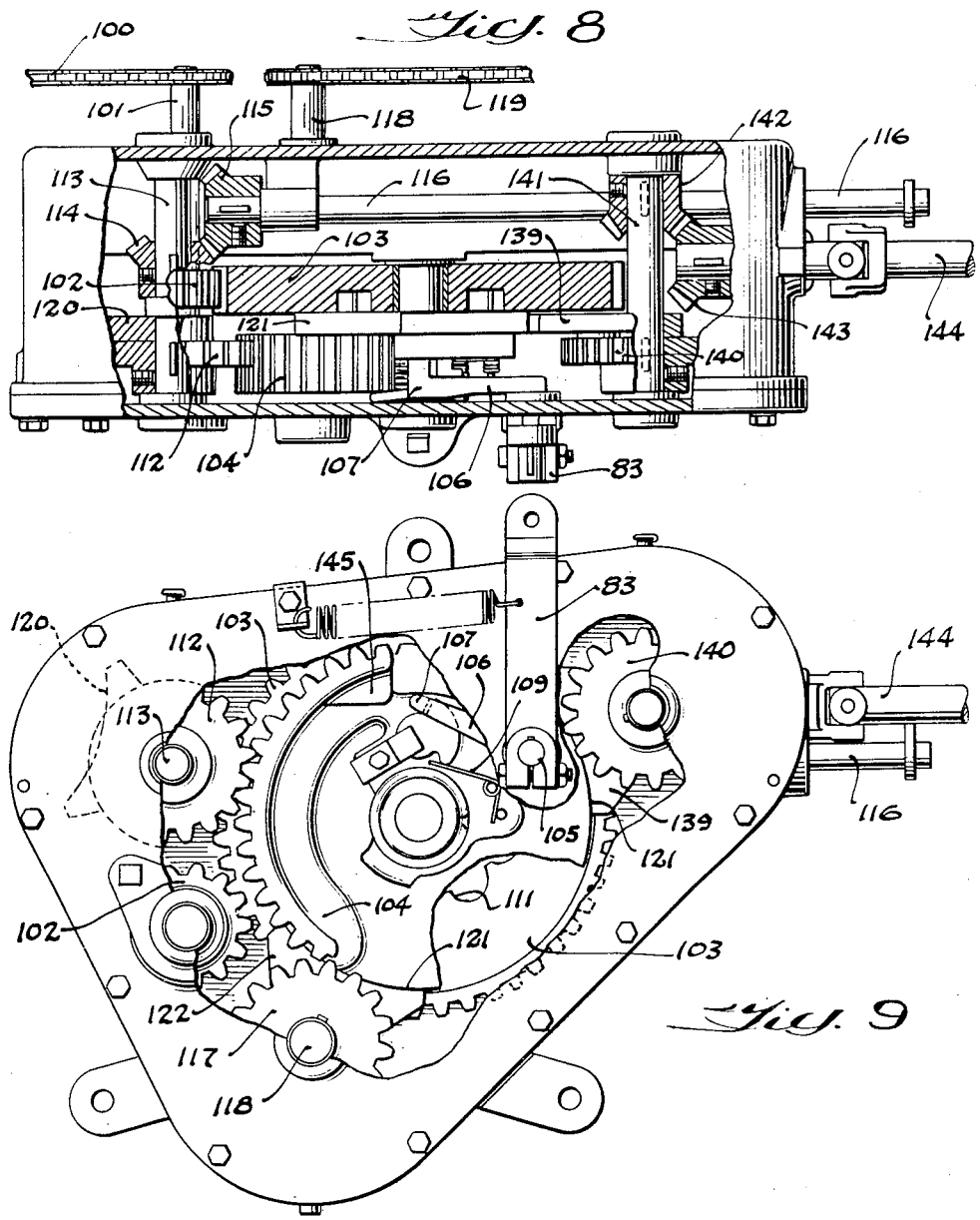
INVENTOR
Edwin B. Nolt
Richard E. Babcock Jr.
BY
ATTORNEY Dec. 4, 1956  E. B. NOLT  2,772,628
BALE METERING AND TRIPPING MECHANISM
Original Filed Sept. 6, 1950  8 Sheets-Sheet 6
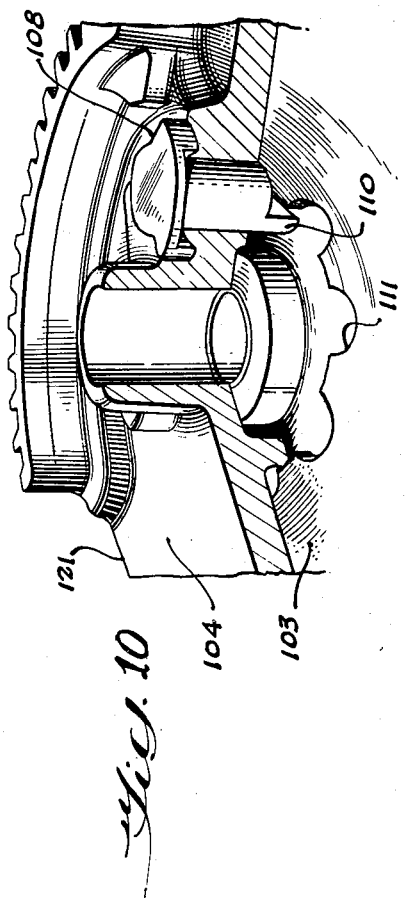
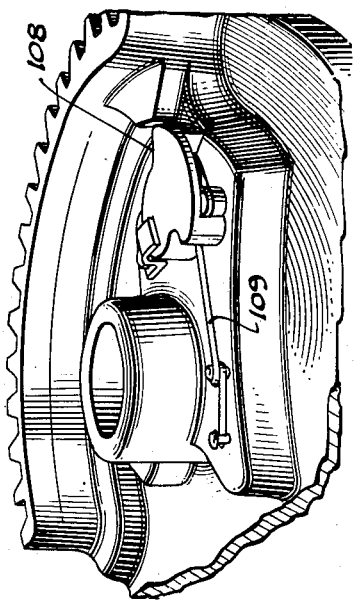
INVENTOR
Edwin B. Nolt
BY Richard E. Babcock Jr.
ATTORNEY

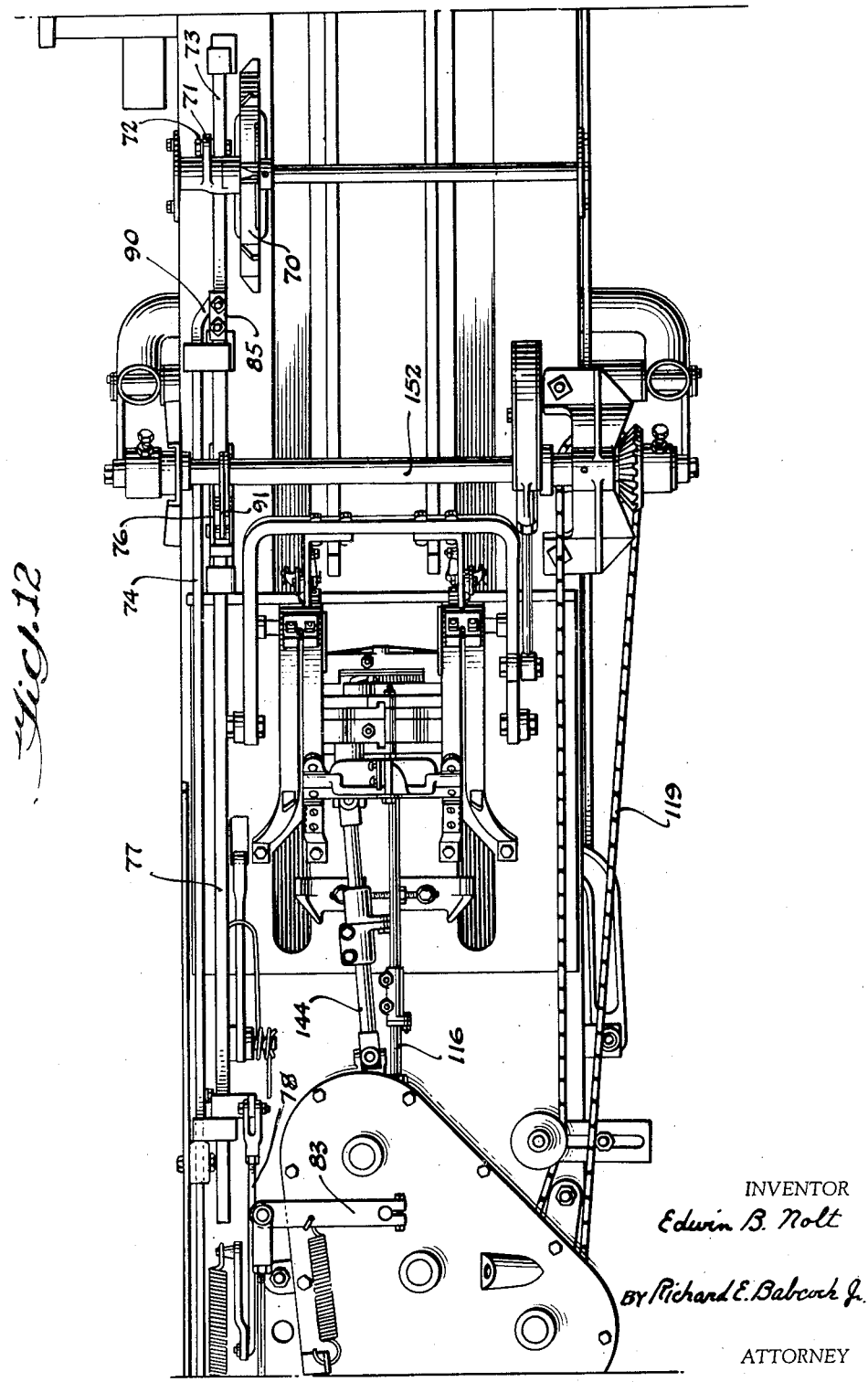

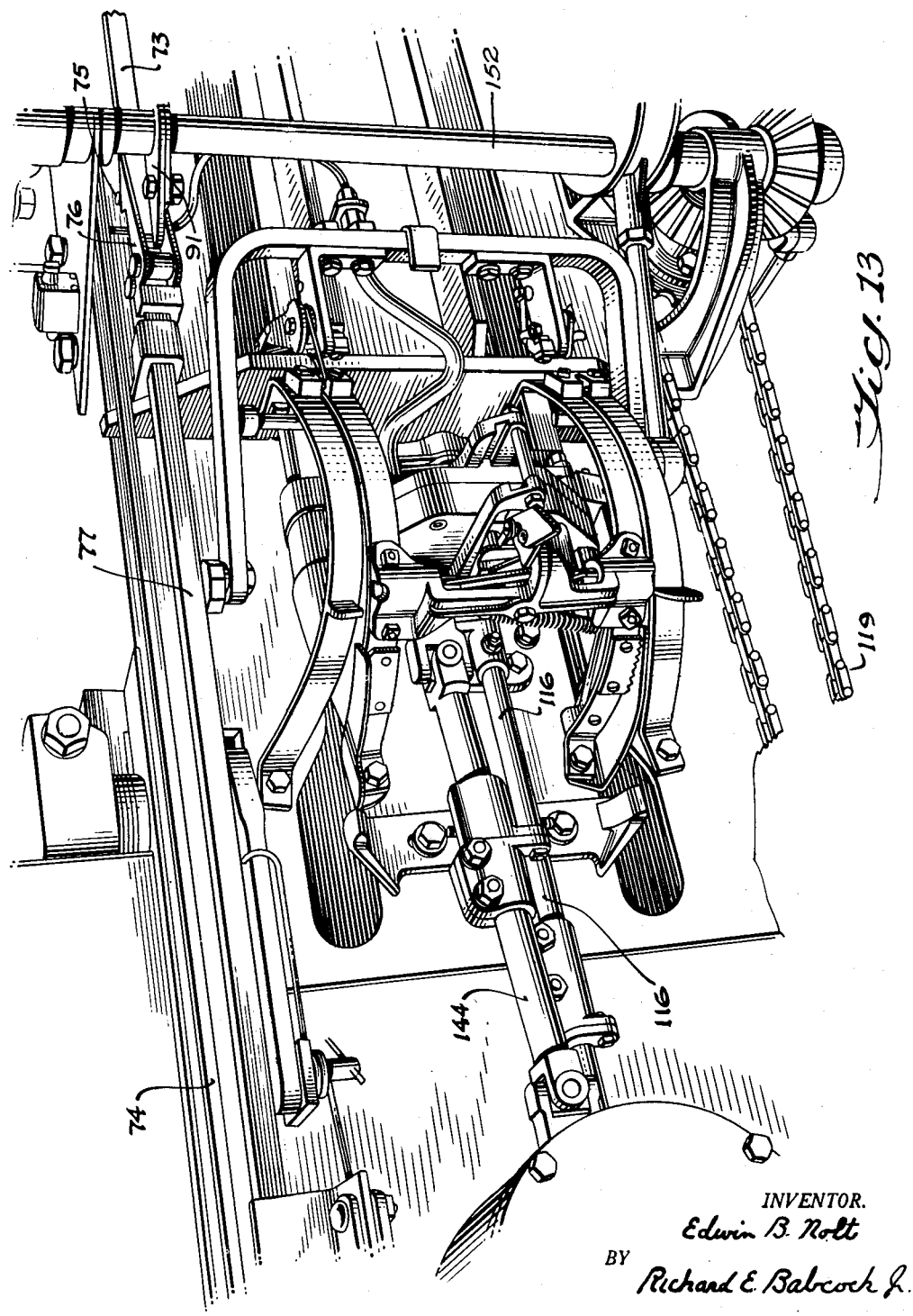

United States Patent Office 2,772,628
Patented Dec. 4, 1956

2,772,628

BALE METERING AND TRIPPING MECHANISM

Edwin B. Nolt, New Holland, Pa., assignor to Sperry Rand Corporation, New Holland, Pa., a corporation of Delaware Original application September 6, 1950, Serial No. 183,321. Divided and this application November 26, 1952, Serial No. 322,717

2 Claims. (Cl. 100—4)

This invention is concerned with an improved baler of the type adapted to be moved through a field to automatically lift hay and the like from the stubble, compress it into a bale, and form and tie bands around the bales with either twine or wire. More particularly, this invention relates to an improved baler metering and tripping mechanism. This application is a division of my application, Serial No. 183,321, filed September 6, 1950.

The baler includes mechanism of the type having a compression chamber and a plunger reciprocable in the chamber for compressing material fed into said chamber into a bale. Said mechanism further includes bale banding means, a disconnectible drive for the plunger, and an automatically actuated latch mechanism for holding said plunger in fixed position at predetermined periods and at the forward end of its stroke to permit said banding means to operate while said bale is held under compression by said plunger. The details of the plunger and disconnectible drive therefor have been omitted since the same are conventional as shown for example in the patent to Nolt No. 2,236,628, granted April 1, 1941.

The plunger of the baler is driven forwardly a number of times to complete a bale, and with each stroke of the plunger, a suitable knife means mounted on the plunger and bale case respectively, are operative to sever each charge of hay from the material being fed into the baler whereby to produce a separate slice. As each stroke proceeds, each slice is individually compressed so that it may be separately removed from the bale when the bale is opened for use.

The compressed material is moved rearwardly as the new slices are formed, and a star wheel that engages against the side of the compressed material, is positively driven by its motion. With each revolution of the star wheel, a cam fixed to rotate with the star wheel trips a push rod assembly that is adapted to initiate operation of means for feeding the banding material and completing a tying cycle, while at the same time holding the plunger fixed at the outer end of its stroke so that the hay material fed into the baler chamber may be banded while it is held under compression.

After the tying cycle has been completed, the plunger is again connected to its drive mechanism and the slicing and compressing of the continuous flow of incoming hay material may proceed.

When one bale has been built up and banded, it is retained in the compression chamber to form a back wall against which the new material may be compressed. In order to provide a sufficient back pressure to effect a full compression of each slice in the bale being formed, the passage of the previously banded bale through the chamber is retarded by the frictional engagement of the bale with the walls of the chamber. The degree of frictional side wall pressure is controlled by selectively forcing portions of the side walls of the compression chamber inwardly.

The means for delivering the banding material around the bale and for completing the tying og the bands are all driven from a common source, the power being delivered through a gear box to accomplish the proper timing of all of the several elements which must coact together. This gear box includes a segment gear which is driven through one revolution to accomplish the desired sequence of operations and all of the power for driving the band feeding and tying means is transmitted from the gear box through suitable drive connections to the banding means.

In the preferred showing of the present invention, there is included a pair of cans for holding the wire supply and co-operating needles and wire gripping means to deliver two strands of wire around a bale. After the wire has been passed around the bale, the ends of the wires forming the bands are twisted together and the wires are then severed to separate the completed bands from the wire supply. The pair of needles are both carried on one side of the compression chamber and are adapted to be driven across the chamber through suitable slots provided in the face of the plunger to issue from the far side of the chamber carrying the wires. A cooperating gripper yoke means is then driven forwardly to engage the bight of the wire that has been delivered across the chamber by the needles. The gripper yoke is then returned to its starting position and while moving rearwardly along the bale chamber, lays the inner one of the strands of the bight of the wire in the wire twisting means to overlay the free end of the wire which was delivered into the twisting means as the gripper yoke moved forwardly to meet the needles.

As above stated, the needles and gripper yoke are all positively driven from the common gear box drive, and their motions are synchronized with the motions of the twisting and severing mechanism through the segment gear so that the twisting or tying operation is fully automatic. This entire train of motions in the wire feeding means and tying mechanism is set into operation when the push rod mechanism is tripped by the cam on a metering wheel, which push rod means in addition to initiating the stopping of the compressing plunger, also shifts a clutch means to connect the segment gear to its drive means.

Figure 6A:
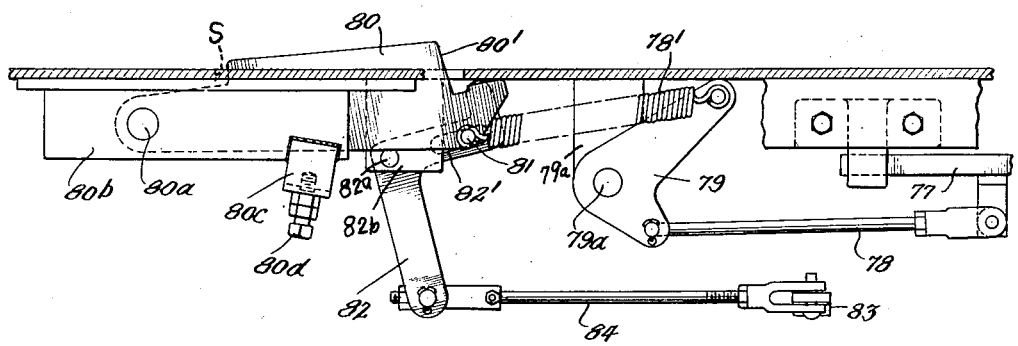
Figure 7:
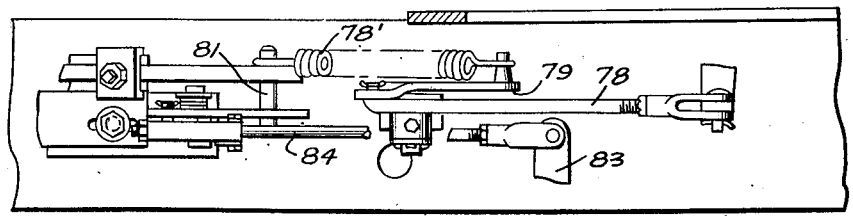

In the drawings:

Figure 1 is a front perspective of the baler on which the metering and trip mechanism of this invention is employed; Fig. 2 is a top plan view of the machine shown in Fig. 1, partly broken away; Fig. 3 is an enlarged top plan view of a portion of the push rod trip assembly of this invention; Fig. 4 is a side elevation of the wire tying side of the machine; Fig. 5 is a view taken on line 5—5 of Fig. 2; Fig. 6 is a top plan view of the compressing plunger latch in unlatched position and showing the mechanism employed for throwing the latch; Fig. 6a is a view similar to Fig. 6, but showing the latch in latched position; Fig. 7 is a side elevation of the mechanism shown in Fig. 6; Fig. 8 is a top plan view of the gear box, partly broken away, for driving and timing the movement of the wire feeding, twisting and severing mechanisms; Fig. 9 is a side elevation of the gear box shown in Fig. 8, partly broken away; Fig. 10 is a fragmentary detail assembly view partly in section, showing the gear box segment gear clutch arrangement with the clutch disengaged; Fig. 11 is a view similar to Fig. 10 showing the clutch in the position occupied when the pawl of the clutch is engaged in a notch in the drive gear; Fig. 12 is a detail side assembly of a portion of the wire-tie or twister side of the machine; Fig. 13 is a detail perspective of the wire twister mechanism; and Figs. 14 and 15 are diagrammatic views of the power drive system.

The machine forming the subject of this invention is shown in its preferred form as adapted to be towed behind a tractor, and includes means for tying two wire bands around the bales as they are formed in the compression chamber. Referring to Fig. 1, it will be seen that the baler has a tongue 10 that may be connected to a drawbar of a tractor so that the baler trails behind the tractor to be moved through the field.

The machine may be made fully automatic, and after the engine 11 has been started and the mechanism put in motion, the tractor operator need only pull the machine through the field so that the pick-up 12 follows down a windrow of the material to be baled to feed it into the machine.

Bale or compression chamber

After each wad of hay is delivered into the compression chamber, it is simultaneously compressed and fed forwardly under the pressure of the plunger. The usual spring fingers hold each of the slices in position while the plunger is moving through its return stroke and the wad is pushing a succeeding wad of hay into position.

When the bales have been completed and tied, additional wads of hay to form the next bale are pressed against the end of the finished bale one at a time and the tied bale is slowly pushed toward the exit of the bale chamber. As the tied bale is moved rearwardly, it is engaged by the side walls of the bale chamber which are free to flex inwardly under the influence of a hydraulically operated pressure creating means, see Figs. 2, 4 and 5. In accordance with this teaching, the wall sections 60 and 61 are forced inwardly by a hydraulically driven piston mounted in the chamber 62, which is preferably fixed to the side wall section 61. A suitable yoke 63 is arranged to surround the bale chamber in a manner to transmit the power from the piston to the opposite wall section 60 so that any pressure produced on the piston in chamber 62 is effective to hold the wall sections 60 and 61 pressed inwardly against the walls of the bale with a constant pressure of a degree dependent on the pressure produced in cylinder 62.

The cylinder 62 is connected by a pressure line 64 with the hydraulic pump 65 so that a uniform and constant pressure may be produced in the chamber. The pump 65 is operative to create any desired static pressure in the oil line 64 so that by pre-setting the pressure produced by the pump, the degree of pressure of the wall sections 60 and 61 against bales pushing through the chamber can be controlled. The degree of the drag produced against the bales moving through the rearmost portion of the bale chamber determines the degree of compression that can be produced against each of the wads of hay fed into the baler.

As the bales are formed, the compressed hay is tied with two bands of wire, as shown in the preferred form of this invention, and suitable wire banding and tying or twisting means are associated with the baler mechanism to accomplish this banding operation. As the bands are completed, they are delivered from the tying mechanism and fall close against the walls of the completed bale through the slots 66 provided in the side walls of the bale chamber at the rear end thereof.

Meter wheel and trip mechanism

The wads of hay material or the like are fed into the bale chamber and pushed rearwardly by the plunger to be compressed against the previously completed bale. All the while the hay is being compressed and fed rearwardly in the chamber, it is engaged by the rotatably mounted star wheel 70, see Figs. 2 and 3. The star wheel may be selected to be of a desired size such that it will have been turned through one revolution when the desired length of hay bale has been formed. In the mechanism shown, the star wheel 70 is provided with an integral cam 71 which is carried around to engage a pin 72 fixed to a slidably mounted rod 73. The star wheel acts through the rod 73 to move the rod so as to initiate a tripping action which, with the assistance of a powered booster or push rod 74, causes the wire feeding and tying cycle to take place.

The rod 73 extends forwardly along the bale case past the star wheel and is connected through a pin 75 to a spring latch 76 integral with a rod 77 (Fig. 3). Rod 77 is connected through a member 77a to a link 78. Rod 73 pulls rod 77 and link 78 to the right (Figs. 3, 6, 6a, 12 and 13) when the tripping action takes place, the pulling action being augmented by power supplied from reciprocating push rod 74. The motion of link 78 operates a toggle 79 (Figs. 6, 6a and 7) pivotally mounted at 79a on a bracket 79b affixed to the bale case.

One end of a spring 78' is connected to toggle 79. The opposite end of the spring is connected to a plunger stopping latch 80 by means of a pin 81. Latch 80 is pivotally supported at 80a (Figs. 4, 6 and 6a) in a bracket 80b affixed to the bale case. Welded or otherwise secured to bracket 80b is a support bracket 80c which carries a threaded bolt 80d, the inner end of which engages the outer marginal edge of latch 80. Bolt 80d is used for adjusting the position of the inner marginal edge of latch 80 relative to the bale casing.

When rod 77 and link 78 are moved to the right (Fig. 3) toggle 79 is shifted from the position shown in Fig. 6 to the position shown in Fig. 6a. The movement of the toggle operates through spring 78' to swing latch 80 about its pivot and urge it through slot S in the adjacent side wall of the bale casing. Latch 80 has an operative face 80' which is adapted to engage behind the plunger in the bale casing at the end of a working stroke to hold the plunger against retraction. Face 80' is such that it assumes an angular position with respect to the rear end of the plunger. Therefore, on retraction of latch 80, face 80' is easily disengaged from the plunger without catching thereon.

The pin 81 which connects spring 78' to latch 80 also serves to connect the latch 80 to a lever 82. Lever 82 is pivotally mounted at 82a on a bracket 82b affixed to the bale case. Pin 81 extends through a lost-motion slot 82' (Figs. 6 and 6a) in lever 82 and when latch 80 is thrown into operative position behind the plunger, lever 82 is pivoted. A link 84 connected to lever 82 is moved to the right from the position shown in Fig. 6 to the position shown in Fig. 6a. Link 84 is connected to and throws a lever 83 adapted to initiate the operation of the gear box drive and tying mechanism.

Since considerable force is required to throw the toggle spring 78', the above mentioned power booster or push rod 74 is provided, see Fig. 16, the nose of which engages behind the forward end of lug 84 to assist in driving rod 73 to the right. The push rod 74 is mounted to have a reciprocating movement alongside the bale chamber and extends to the forward end of the twister side of the bale chamber where it is connected through the link 86 (see Figure 2) with a suitable cam follower which is adapted to coact with the cam 87 driven from the main drive gear integral with the crank shaft from which the compression plunger is driven. The push rod 74 is continuously driven to have a reciprocating motion by the oscillating lever 86 and spring 88 which is adapted to pull the rod forwardly after the lever has passed over the high point of cam 87.

The lug 84 is normally disposed in position such that when rod 73 is in its untripped position, the downwardly turned nose 90 of the push rod 74 rides on top of the lug 84. When the cam 71 of the metering wheel, however, pushes the rod 73 to the right a short distance, see Fig. 16, the nose 90 of the push rod 74 rides off of the forward end of lug 84 and drops down to engage behind it to push rod 73 to the right with sufficient power to trip the toggle mechanism and start the operation of the tying cycle; the bearings or guides which slideably support the rod 74 are arranged to permit sufficient free vertical movement of the push rod to enable its aforesaid functioning.

Upon completion of the tying cycle, a cam 91 fixed to the drive shaft of the needle yoke forming part of the tying mechanism, engages a pin 76a on the latch 76 to uncouple the push rod 73 from push rod 77 and drive rod 77 forwardly to return the toggle mechanism 79 to its starting position, as shown in Fig. 6. The motion of toggle plate 79 withdraws the plunger latch 80 from behind the plunger so that the plunger can be again connected to the drive system to continue the compressing operations. When movement of the hay through the chamber is again established, the star wheel is driven to rotate and the cam 71 is then driven past the pin 72. When the cam releases the pin, the push rod 73 is retracted to the left, see Fig. 3, to its initial starting position by a suitable spring 73a and the rod 73 is engaged behind the catch 75 to reset the trip mechanism for its next cycle. The nose 90 of push rod 74 is lifted on each return stroke of the push rod to pass up onto the top of the lug 85 when it returns to its starting position to complete the resetting. This lifting is accomplished by the sliding engagement between the downwardly curved nose 90 and the bearing that supports the rearmost end of push rod 74.

*Gear box*

The gear box drive means, for timing the sequence of operations of the mechanism adapted to perform the tying cycle, is mounted on the side of the bale compression chamber, and referring to Figs. 4 and 8, it will be seen that the gear box receives power from sprocket wheel 99 integral with the crank shaft that drives the compressing plunger, the power being delivered to the gear box through sprocket chain 100 to drive shaft 101 that has pinion gear 102 keyed thereto. The pinion 102 meshes with the drive gear 103 which is constantly rotated within the gear box to provide power for operating the elements of the tying mechanism through suitable drive connections that become energized when the tying cycle is to be performed.

As above described, after a bale has been completed and is to be banded, the lever 83 is tripped by the push rod mechanism and toggle drive, and then the segment gear 104 is connected to the driving gear 103 by means of the pawl clutch arrangement which is best shown in Figs. 9, 10 and 11. Referring to Fig. 9, the lever 83 is connected to shaft 105 which has a lever 106 at its inner end, the lever 106 being provided with an offset nose portion 107 which is adapted, before the tripping action is initiated, to engage behind the surface 108 forming a portion of the leading edge of the cap portion of the pawl clutch. As long as the nose 107 is engaged behind the surface 108, the pawl clutch is held in the position shown in Fig. 10, so that the driving gear 103 passes by the pawl at the lower end of the clutch and the segment gear remains at rest. When the lever 83 is shifted to the right, Fig. 9, as the toggle mechanism is tripped, the nose 107 is raised and the spring 109 flips the cap of the pawl clutch to the position shown in Fig. 11. The energy supplied by the spring partially rotates the pawl clutch element to cause the half round section 110 at the lower end of the pawl to move into position to be engaged by the wall section of one of the recesses 111 formed in a recess in the hub portion of the driving gear 103. When the half round section 110 is engaged in a recess 111, the segment gear is carried around with the driving gear and several pinion drive means positioned in the gear box are engaged by the teeth of the segment gear to drive the various elements of the tying mechanism to complete the tying cycle.

At the start of its cycle, the segment gear is in the position shown in Fig. 9 with pinion gear 112 in contact with the center portion of the gear track of the segment gear. When the segment gear begins to rotate, the pinion 112 is driven to turn the shaft 113 through one-half a revolution, and shaft 113 in turn drives the miter gears 114 and 115 to drive the shaft 116 that is connected at its rear end with a means to project the wire twisting means into position to receive the ends of the wires which are to be twisted to form the bands around the bale.

Also immediately at the start of the gear box cycle of operations, the segment gear engages the pinion 117 to drive the shaft 118 having a sprocket wheel keyed to its outer end that drives sprocket chain 119. Sprocket chain 119 constitutes the drive to a common drive shaft for operating the needle means that complete the feeding of the wires around the bale and for operating the wire gripper yoke which holds the free ends of the wires and cooperates with the needles to deliver the wires to the twisting means.

It is thus seen that because the segment gear forms a common drive for the wire twister projecting means, and the needle and the wire gripper means, that all of these elements move in timed relation to project the wire twister in time to receive the wire. As soon as pinion 112 has been turned through one-half a revolution and the wire twister is projected to its outermost limit, the holding arc 120 integral with pinion 112, is engaged over the circular portion 121 of the segment gear to hold the pinion 112 against rotation to thereby fix the twister in its projected position until the surface 121 is rotated to move out from under arc 120. The arc and circular portion are proportioned to be held in engagement while the twisting of the wires is completed and the bands are severed from the wire supply. Similarly, after the segment gear completes its driving of the pinion 117 through one revolution so that the needles and wire gripper yoke have completed their motions, the arc 122 integral with pinion 117 engages the surface 121 to hold pinion 117 fixed during the remainder of the revolution of the segment gear.

While the segment gear is moving through the first portion of a single revolution, it drives the pinions 112 and 117 as described above, and during this portion of the rotation of the segment gear, the arc 139 of a pinion 140 rides surface 121 of the segment gear. Immediately after pinion 117 has been driven through one revolution arc 139 rides off surface 121 and the segment gear meshes with pinion 140 to drive it through one revolution. The pinion 140 is keyed to the shaft 141 which drives the miter gears 142 and 143 to transmit motion through shaft 144 and suitable universal joints to drive the slotted wire twisting gears and the severing means. After driving the pinion gear 140 for one full revolution, arc 139 again passes onto surface 121 and the teeth of the segment gear are again driven into contact with pinion 112. At this time, arc 120 has been freed from its contact with surface 121 so that the pinion 112 may be rotated for another one-half revolution as the segment gear completes its one revolution to return to the position shown in Fig. 9. During this half of the revolution of pinion 112, the wire twister mechanism is retracted so that the completed bands are stripped from the twisting mechanism by suitable stripper cams in order that they may be laid against the sides of the completed bale.

The several elements of the wire feeding and twisting means are thus timed to have a proper sequence of operations and receive their driving power through one revolution of segment gear 104. It will be noted too that at a proper time in the tying cycle, the cam 87 on the common drive shaft for the needle yoke and wire gripper yoke resets the trip mechanism for the next succeeding bale tying operation and when rod 77 of the trip mechanism is unlatched from rod 73 by cam 87 and is driven to the left as in Fig. 3, the toggle 79 is reset. The return movement of toggle 79 by means of cam 87, retracts the plunger latch 80 and resets lever 83 to bring nose 107 down into position to catch surface 108 on the cap of pawl clutch as it comes around the top of the path of revolution of the segment gear. When surface 108 is engaged by nose 107, the pawl 110 is rotated out of contact with its cooperating recess 111 and the drive connection from gear 103 to the segment gear is released. If for any reason, the cam 87 should fail to reset the trip rod mechanism, a cam 145 is provided on the inside of the rim of the segment gear, the cam being adapted to engage nose 107 if it has not been properly reset, to move it downwardly into position to catch surface 108 to positively stop the twister drives after one revolution of the segment gear.

*Drive system*

A diagrammatic showing of the drive to the various elements of the machine is shown in Figs. 14 and 15.

Referring first to Fig. 1, the motor 11 is connected by a pulley 230 to flywheel 231 which is connected by a pinion gear 232 to bull gear 233 that is integral with the crank shaft for driving the compressing plunger.

A sprocket wheel 234, see Fig. 4, is mounted integral with the bull gear to drive sprocket chain 100, which transmits power to the gear box timing and drive means. The gear box, as previously described, through the segment gear drives the sprocket chain 119 to effect operation of the gripper yoke and needle yoke in timed sequence to the movement of the twister mechanism.

The flywheel 231 has a sprocket chain 235 driven from sprocket wheel 236 integral therewith, the sprocket chain 235 being trained over the sprocket wheel 237 that drives the hydraulic pump to create a pressure for controlling the bale tension means 62. The sprocket chain 235 is also trained over sprocket wheel 238 which drives the shaft 239 that transmits power to the sprocket chain 240 that in turn drives shaft 241 providing power for the sheave 35 that drives the pick-up mechanism. Sheave 35 is connected to the driven elements of the pick-up mechanism in a manner fully described in my parent application previously referred to.

*Operation*

The baler forming the subject of this invention is adapted to be towed behind a tractor and moved through a field to pick up hay which has been previously raked into a windrow. The pick-up means 12 is driven down the windrow to lift the windrow into the feed chute and spring fingers are operative to carry the hay upwardly so that it passes under the feed roll which delivers it into an auger. The auger is continuously rotated to deliver the material into position over the bale chamber, and a wad board 52 is reciprocated to press the hay into the compression chamber in front of the compression plunger.

The plunger is reciprocated to compress each batch of hay delivered into the compression chamber and includes a knife means to simultaneously cut any strands of hay passing between the wad of hay delivered into the chamber and the hay still in the auger feed means. As the slices are compressed, the hay is pushed deeper into the bale chamber, and as it is moved into the chamber, the measuring wheel 70 is rotated. After the measuring wheel 70 makes one revolution, it trips the powered push rod trip mechanism, including rods 73 and 77 to throw the toggle 78 that is adapted to project the plunger stopping latch 80 and initiate the wire banding and twisting operation. The compressing plunger is held stationary while the wire feeding and twisting operations are completed.

After the bale has been completed, it is held in the compression chamber to provide a back pressure against which the infeeding hay may be pressed to produce the next succeeding bale. The fully formed bale is not ejected from the compression chamber until the new bale has been formed and banded.

The description given above covers the preferred form of this invention. It is apparent that many of the features of this device may be adapted to other forms of baler, including pick-up balers adapted to tie twine around the completed bales. It is, therefore, intended that this description be considered merely as one example of the best way of performing this invention, and it is contemplated that many modifications thereof may occur to those skilled in the art, which will fall within the scope of the following claims.

I claim:

1. In an automatic hay baler comprising a bale case, a plunger normally reciprocable therein, and a normally non-operating banding means for forming bands around completed bales, the combination comprising a latch mounted on said bale case for movement into operative engagement with the plunger to lock said plunger in an advanced position, mechanism associated with said latch for moving said latch to and from an operative position in operative engagement with said plunger, said mechanism including a toggle arm pivoted on said bale case having an end pivotal between a first over-center position adjacent said bale case and a second over-center position remote from said bale case, and an overcenter spring having one end connected to said toggle arm end and at its opposite end connected directly to said latch, said spring urging said latch toward and away from its operative position responsive to positioning of the toggle arm end in its respective overcenter positions, a source of power, means interconnecting said source of power and said banding means, including a normally disengaged clutch and a control element for the clutch, and means directly connecting said control element to the latch whereby on movement of the latch said control element is actuated.

2. In an automatic hay baler comprising a bale case, a plunger normally reciprocable therein, and a normally non-operating banding means for forming bands around completed bales, the combination comprising a latch mounted on said bale case for movement into operative engagement with the plunger to arrest the movement of the plunger, mechanism associated with said latch for moving said latch to and from operative position, said mechanism including a toggle arm pivoted on said bale case, and an over-center spring connected between said toggle arm and said latch, said toggle arm being positionable into first and second over-center positions with respect to said spring, said spring being connected directly to the latch and urging said latch toward and away from its operative position responsive to positioning of the toggle arm in its respective over-center positions, a source of power, means interconnecting said source of power and said banding means including a normally disengaged clutch, and means operative on movement of said latch to operative position to move said clutch to engaged position whereby upon movement of said latch to a position arresting the movement of said plunger, actuation of said banding means is initiated.

References Cited in the file of this patent

UNITED STATES PATENTS

| | | |
|---|---|---|
| 1,369,612 | Bowers | Feb. 22, 1921 |
| 2,236,628 | Nolt | Apr. 1, 1941 |
| 2,548,559 | Ronning et al. | Apr. 10, 1951 |
| 2,560,143 | Vietti | July 10, 1951 |